United States Patent
Kim et al.

(10) Patent No.: US 6,340,998 B1
(45) Date of Patent: *Jan. 22, 2002

(54) THIN FILM TRANSISTOR LIQUID CRYSTAL DISPLAY INCLUDING AT LEAST THREE TRANSISTORS ASSOCIATED WITH AN UNIT PIXEL

(75) Inventors: Byung-Hee Kim, Kyonggi-do; Sun Hwa Kim, Seoul; Seung Gon Kang; Hyun Eok Shin, both of Kyonggi-do; Young Il Choi, Seoul, all of (KR)

(73) Assignee: Samsung Display Devices Co., Ltd, Kyonggi-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,037

(22) Filed: Mar. 29, 1999

(30) Foreign Application Priority Data

May 20, 1998 (KR) .............................................. 98-18105

(51) Int. Cl.⁷ ...................... G02F 1/136; G02F 1/1333; G02F 1/13
(52) U.S. Cl. .............................. 349/48; 349/54; 349/192
(58) Field of Search ........................... 349/54, 48, 139, 349/192

(56) References Cited

U.S. PATENT DOCUMENTS 4,368,523 A * 1/1983 Kawate ....................... 349/93
5,303,072 A * 4/1994 Takeda et al. ................ 349/48
5,621,555 A * 4/1997 Park ............................ 349/54
5,715,025 A * 2/1998 Ogurtsov et al. ............. 349/42
6,011,530 A * 1/2000 Kawahata et al. ............ 349/48

FOREIGN PATENT DOCUMENTS

JP 4-243232 8/1992

* cited by examiner

Primary Examiner—William L. Sikes
Assistant Examiner—Tarifur R. Chandhury
(74) Attorney, Agent, or Firm—Robert E. Bushnell, Esq.

(57) ABSTRACT

A thin film transistor liquid crystal display according to the present invention provides against cut-off of lines for supplying a predetermined 'ON'- or 'OFF'-signal to thin film transistors and improves 'ON'-current characteristic of the thin film transistors arranged in parallel. The thin film transistor liquid crystal display comprises primary lines and secondary lines to supply scanning signals and data signals respectively wherein each of said primary and secondary lines are branched and a thin film transistor is electrically coupled to each of the branched lines such that at least two transistors are turned on and off simultaneously when one of primary lines and one of secondary lines are applied with scanning signals and data signals respectively. Particularly, the primary and secondary lines are patterned in a trapezoid shape to define a lattice having two vertical sides and two horizontal sides for a unit pixel electrode.

12 Claims, 5 Drawing Sheets

Gate Line

Source Line

Fig. 4 *(Prior Art)*

THIN FILM TRANSISTOR LIQUID CRYSTAL DISPLAY INCLUDING AT LEAST THREE TRANSISTORS ASSOCIATED WITH AN UNIT PIXEL

BACKGROUND OF THE INVENTION

1 Field of the Invention

The present invention relates to a thin film transistor liquid crystal display and, more particularly, to a line lay-out pattern of a thin film transistor liquid crystal display capable of providing against cut-off of lines for supplying a predetermined 'ON'- or 'OFF'-signal to thin film transistors and improving 'ON'-current characteristic of the thin film transistors arranged in a parallel.

2 Description of the Prior Art

As well-known, such a liquid crystal display (LCD) device is a typical display that, depending on the dielectric anisotropy feature of liquid crystal materials, controls the amount of light to be penetrated so as to depict image pixels on a screen. Profitably, such a LCD device is employed in a lap-top computer, a word processor, a portable television set and so on.

In general, the LCD device may be fabricated in a simple matrix structure in which two strip-shaped electrodes are intersectionally formed in a matrix manner and, thus, the arranged status of liquid crystal material positioned between the electrodes is controlled by way of the voltage generated at the intersection of the electrodes, and an active matrix structure in which thin film transistors serving as switching means for driving image pixels are associated with the simple matrix structure to enhance a contrast, a drive duty ratio and a multi-gray level of the pixels.

FIG. 4 shows a typical reflection type LCD device with thin film transistors, which is employed with the aforementioned active matrix structure. The LCD device shown in the FIG. 4 includes a upper substrate 30, a lower substrate 50 and a liquid crystal layer 72 which are disposed in a staked structure.

In addition, a polarizing plate 36 is disposed on the upper substrate 30 while a color filter 34 and a common electrode 32 made of ITO (Indium tin oxide) are disposed at a lower side of the upper substrate 30 in order.

Typically, a thin film transistor T is designed between the lower substrate 50 and a corresponding pixel electrode 52 formed at an upper side of the lower substrate 50. Preferably, the thin film transistor T is electrically connected to the pixel electrode 52 via a corresponding contact hole CH penetrated through an insulating layer 54 formed between the lower substrate 50 and the pixel electrode 52. Further, the arranged direction of the liquid crystal layer 72 formed between the common electrode 32 and the pixel electrode 52 can be oriented along the rubbing direction of two orientation films 75a and 75b.

FIG. 5 shows a line layout diagram of 3×3 matrix of a conventional liquid crystal display device. In the drawing, gate lines GL and source lines SL, which are connected to a corresponding drive circuit (not shown), are made of a metal film, for example Cr, Mo, Al and so on, and are intersected with each other. Furthermore, the thin film transistor T having a gate electrode G, a drain electrode D and a source electrode S is formed within a lattice defined by the intersected lines GL and SL so that the gate electrode G and the source electrode S of the thin film transistor T are electrically connected to the corresponding gate line GL and the corresponding source line SL.

According to the liquid crystal display device thus constructed, the thin film transistor T which receives a drive signal from the drive circuit through the gate line GL and the source line SL outputs an electric pixel driving signal to the pixel electrode 52, selectively. In this way, liquid crystal molecules of the liquid crystal layer 72 positioned between the pixel electrode 52 and the common electrode 32 can be controlled to have a twisted angle that is in discord with the polarizing direction of the polarizing plate 36.

In such a conventional liquid crystal display device, however, since the gate lines GL and the source lines SL are designed in fine line-width from the structural point of the line layout, a disadvantageous defect may be easily generated on the gate lines GL and/or the source lines SL during a photolithography process or an etching process.

In addition, if the defect is occurred on the lines GL and/or SL. unexpected problems can be also occurred as follows.

First, resistance of the defected portion of the line GL and/or SL is increased to distort the pixel driving signal. For this reason, the contrast may be partially varied on the same image screen, thereby deteriorating the quality in display of the image.

Second, since increased current flows concentrically through the defected portion of the line GL and/or SL, cut-off of the line GL and/or SL may be easily occurred by reason of movement of metal particles forming the defected line portion. If the line is partially cut-off, then a signal current can't flow to the rear of the cut-off portion of the line, thereby generating a linear blanking appearance on the image screen.

Furthermore, disadvantageous problems may be occurred from the thin film transistor T connected between the lines GL and SL and the pixel electrode 52, as follows.

First, while an insulation of a gate insulating layer GI of the thin film transistor T is damaged or destroyed by static electricity charged before a coating process of the liquid crystal display device, or while a miss-alignment in a photo etching process of the pixel electrode 52 and the insulation layer 54 to be carried out after a formation of the electrodes of the thin film transistor T is adversely induced, satisfactory contact between the thin film transistor T and the lines GL and SL or between the thin film transistor T and the pixel electrode 52 can't be ensured. In accordance with a degradation of the thin film transistor T, spot-shaped blanks may be appeared at the portion of the image screen corresponding to the position of the pixel electrode 52 connected with the degraded thin film transistor T.

Thus, even if the rest thin film transistors can be operated normally, the LCD device including only one transistor T deteriorated in function must be abandoned inevitably.

Second, a lifetime of the LCD device depends on that of the thin film transistors T. Therefore, if any one of the transistors T arranged in the matrix structure is degraded in function, the lifetime of the LCD device is also reduced and, thus, the lifetime property of the LCD can't be assured to an extent demanded by consumers.

According to the conventional LCD device having the aforementioned unfavorable problems, as the image screen is designed to be in large size and high definition, the larger numbers of the lines and the thin film transistors are needed so as to drive the image screen to thereby deteriorate the yield and the lifetime property of the LCD device.

Additionally, as the image screen is designed to be in large size and high in definition, the length of the lines must be gradually lengthened to be thereby insufficient the voltage appeared at the end of the lines, deteriorating the display quality of the LCD device unequally.

SUMMARY OF THE INVENTION

The present invention has been made in an effort to solve the above problems.

Accordingly, an object of the present invention is to provide a thin film transistor liquid crystal display (LCD), wherein even if any of line patterns for connecting a drive IC (Integrated Circuit), which outputs a signal necessary to drive a liquid crystal, to a plurality of thin film transistors mounted on a display panel is cut, or if any one of the thin film transistors is deteriorated in function, image pixels still can be turned on and off.

In order to achieve the above-noted object, the present invention provides a thin film transistor liquid crystal display comprising primary lines and secondary lines to supply scanning signals and data signals respectively wherein each of said primary and secondary lines are branched and a thin film transistor is electrically coupled to each of the branched lines such that at least two transistors are turned on and off simultaneously when one of primary lines and one of secondary lines are applied with scanning signals and data signals respectively.

Preferably, the primary and secondary lines are patterned in a trapezoid shape to define a lattice having two vertical sides and two horizontal sides for a unit pixel electrode.

In addition to the above-noted structure of the present invention, at most one of the thin film transistors is connected to each of the branched lines so that if any one of the branched lines is cut, a signal current still can flow to the pixel electrode.

Preferably, the primary line may be the gate line GL or the source line SL. If the thin film transistors are a bottom gate type, the primary line forms a gate line while the secondary line forms a source line, and a part of the gate line is utilized to form a gate electrode of the thin film transistors.

Advantageously, the present invention can be employed in either a reflective type LCD or a transmissive type LCD. However it is more suitable to a reflection type LCD rather than a transmissive type LCD.

This and further objects, features and advantages of the present invention will become more obvious from the following description when taken in connection with the accompanying drawings.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENT

Various embodiments of the present invention will now be described in detail with reference to the accompanying drawings. Wherever possible, the same reference numbers will be used throughout the drawings to refer to the same or like parts.

Figure 1A:
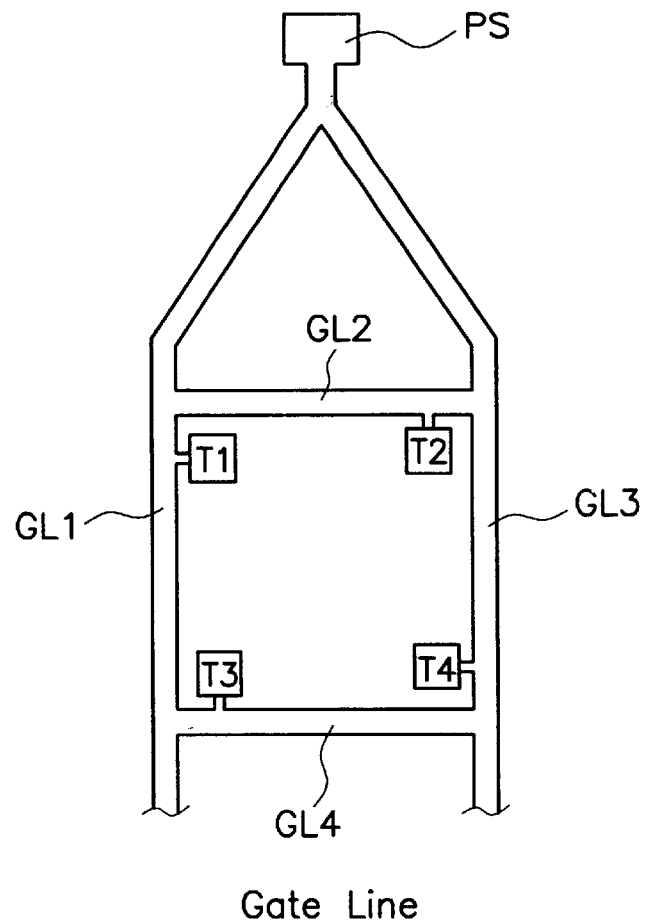
FIGS. 1a and 1b are views separately showing a layout of a line pattern for a thin film transistor liquid crystal display device according to the present invention.
Figure 1B:
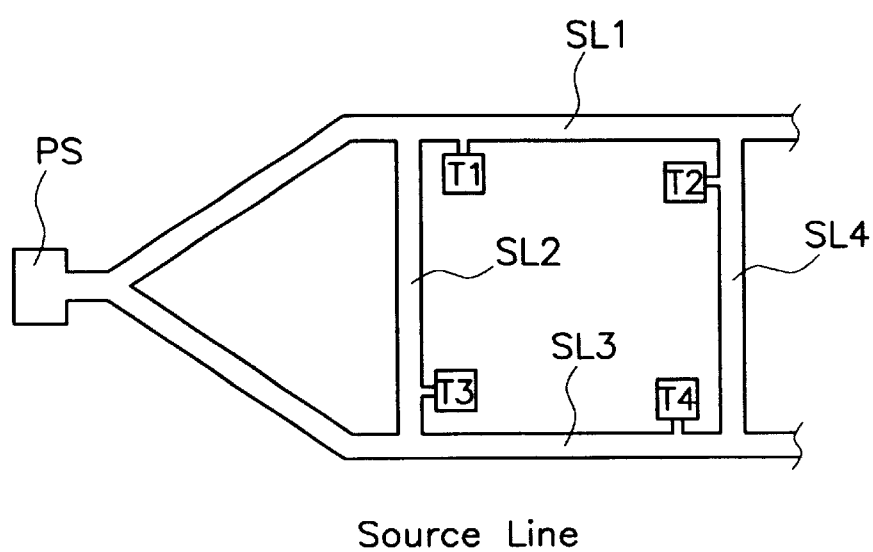

FIGS. 1a and 1b are views separately showing a layout of a line pattern for a thin flim transistor liquid crystal display (LCD) according to the present invention.

Referring to FIG. 1a, a gate line GL defined as a primary line for receiving a signal from a drive IC (not shown) is formed in a lattice shape having two vertical sides GL1 and GL3 and two horizontal sides GL2 and GL4 per a unit pixel electrode by first branching a pattern base portion PS into a right signal line and a left signal line which are spaced by a certain interval and run in parallel with each other, and then connecting the right line and left line with horizontal signal lines, one above and one below the unit pixel electrode.

Figure 2:
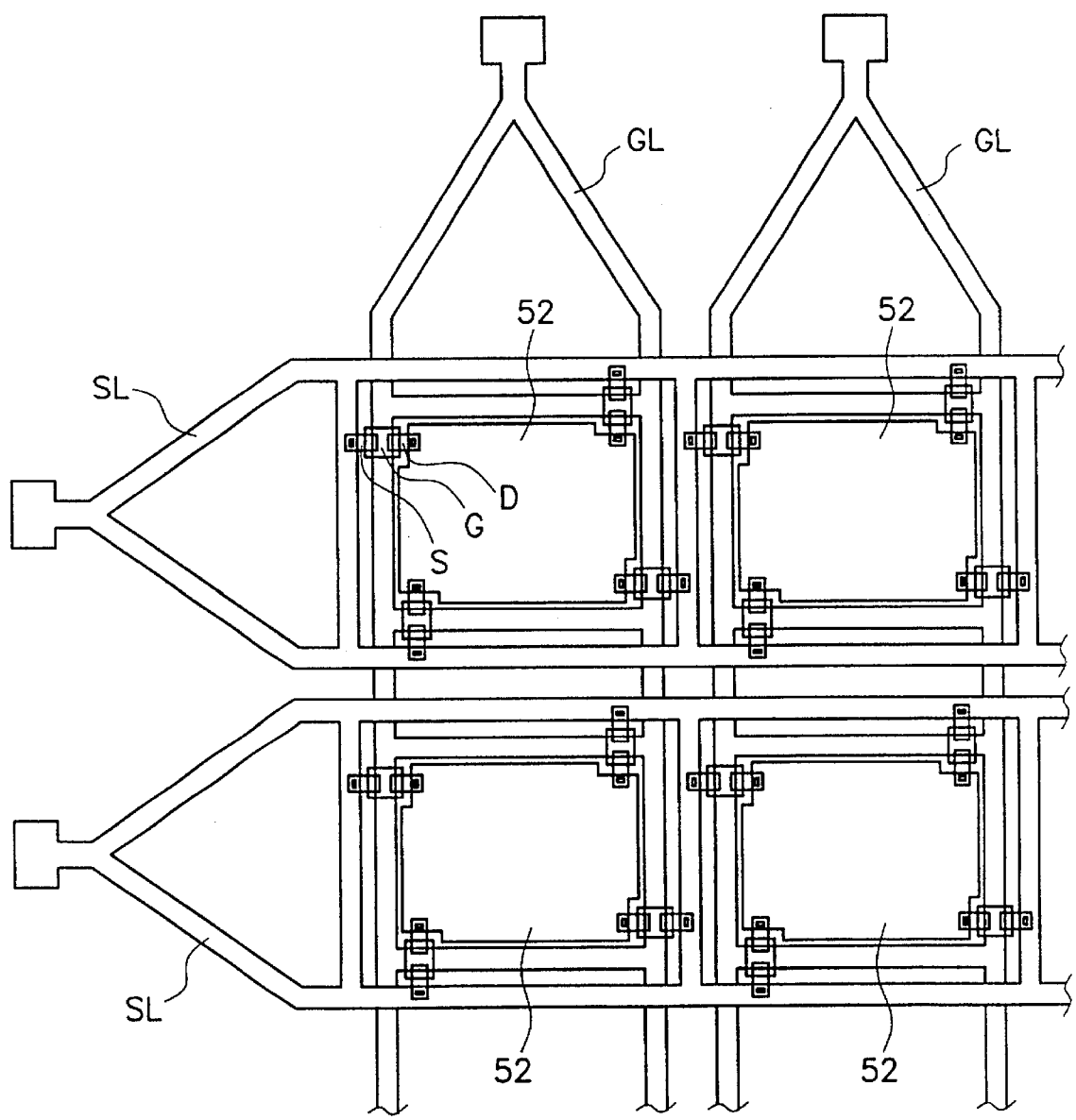
FIG. 2 is a view showing a layout of a line pattern which is stacked with the line patterns of FIGS.. 1a and 1b.

As shown in FIG. 1b a source line SL serving as a secondary pattern is similarly configured to the gate line GL such that SL1, SL2, SL3 and SL4 surround the unit pixel electrode in a form of a lattice. Furthermore, the gate and source lines GL and SL are stacked in a matrix as shown in FIG. 2 so that several pixel electrodes 52 can be simultaneously selected by using a combination of two signals from the lines GL and SL in the same manner with a conventional matrix line layout.

Here, the signal flowing through the gate line GL from the drive IC (not shown) is a scanning signal, while the signal flowing through the source line SL is a data signal.

Practically, while four sides GL1 to GL4 forming a lattice pattern on the gate line GL are connected to the corresponding gates of thin film transistors T1 to T4, four sides SL1 to SL4 forming the lattice pattern on the source line SL are connected to the corresponding sources of the thin film transistors T1 to T4.

Further, the thin film transistors T1 to T4 are connected to a corresponding one of the pixel electrodes 52 in parallel. In this case, when the number of the thin film transistors is two, three or four, no more than one transistor is connected to each one of the sides GL1 to GL4 and SL1 to SL4 respectively. If only one transistor is utilized, this may be connected to any one of the sides GL1 to GL4.

The present invention can be employed in either a reflective type LCD or a transmissive type LCD. However it is more suitable to a reflection type LCD rather than a transmissive type LCD because the area occupied by the lines and the thin film transistors in a pixel is increased with a decreased aperture ratio, as compared with the structure of a prior art matrix line layout.

Since the number of steps of manufacturing the LCD device employing the inventive signal line layout, is equal to that of a conventional LCD device except for an additional step of designing a pattern mask, and, therefore, the cost of manufacturing the LCD device of the present invention is similar to that of the conventional LCD device.

According to the present invention, the primary line may be the gate line GL or the source line SL. In other words, which of the gate line or source line is to be the primary line will be determined depending on thin film transistor structure used, for example, a bottom gate type or a top gate type.

In addition, the size of the lattice for the unit pixel, defined by the gate lines GL1–GL4, may be different to that of the lattice defined by the source lines SL1–SL4. When the lattice on the gate line GL is formed smaller than that of the source line SL as shown in FIG. 2, the primary line can be formed advantageously by using the gate line GL and the thin film transistors T1 to T4 of the bottom gate type can be utilized.

According to the present invention, the gate line GL is patterned together with the gate electrode G of the respective transistor T. Referring to the preferred embodiment of the present invention shown in FIG. 2, the gate line GL is utilized to form the gate electrode G of the thin film transistor T, directly. In order to establish the aforementioned layout structure, it is advantageous that the gate electrode G of the thin film transistor T is formed by using not poly silicone but metal. Further, If the gate electrode G of the thin film transistor T is made of metal, the number of steps of manufacturing the thin film transistor T can be reduced as compared with the case of the transistor having the poly silicone-formed gate electrode.

When the metal-gate electrode structure is established into the thin film transistor, it is desirable that a metallic conductive film must be formed by using a low resistance material, such as Al, Cu, Mo, Ta, Cr, Ti, W or Nd, having specific resistance of 2 to 3, $\mu\Omega\cdot$cm in the thin filmed structure thereof. And, to increase chemical and heat resistances the conductive film may be made of an alloy of the aforementioned elements, for example MoTa—Al, Ta—Al, Cr—Al, Al—Nd or Al—Ti and so on. In this case, a pattern width of the lines G1 and S1 may be set in several $\mu$m.

Figure 3:
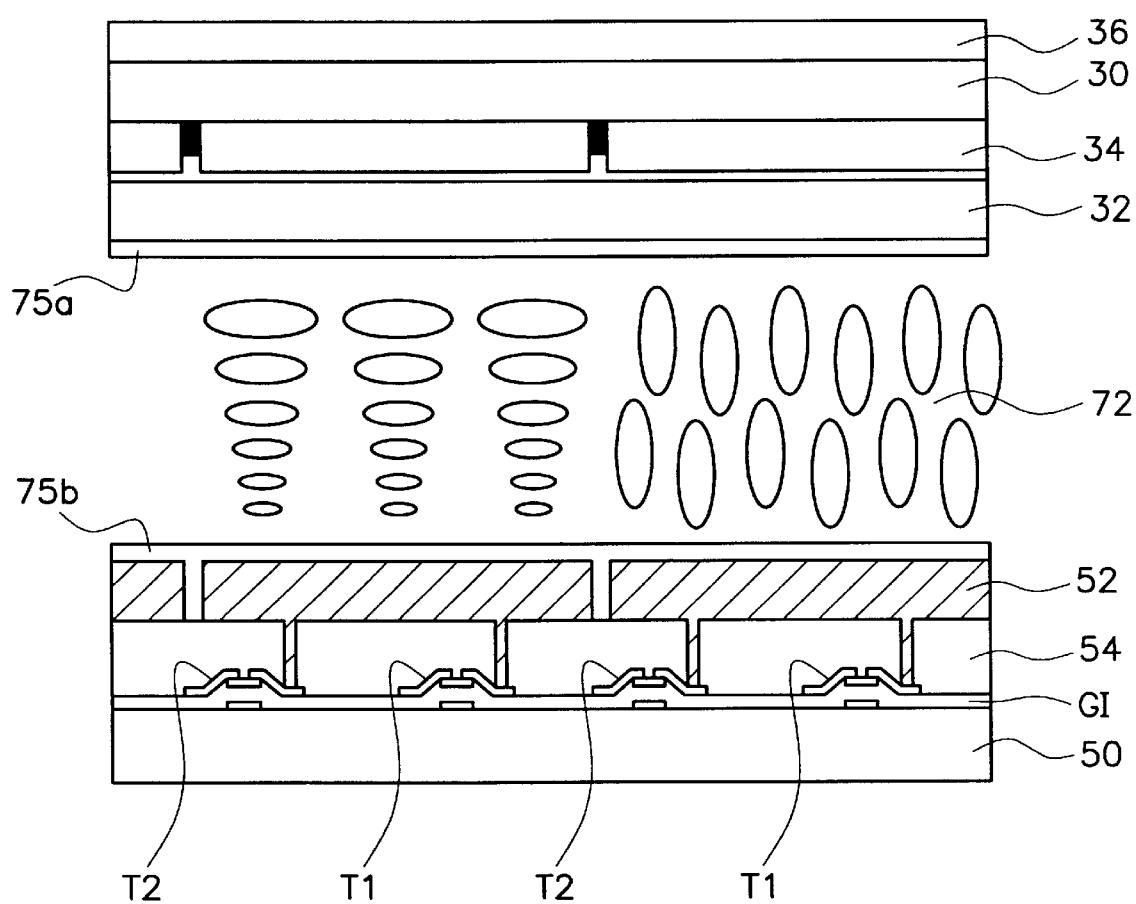
FIG. 3 is a view showing a multi-layer stacked structure of a reflection type thin film transistor liquid crystal display device which is applied with the present invention.
Figure 4:
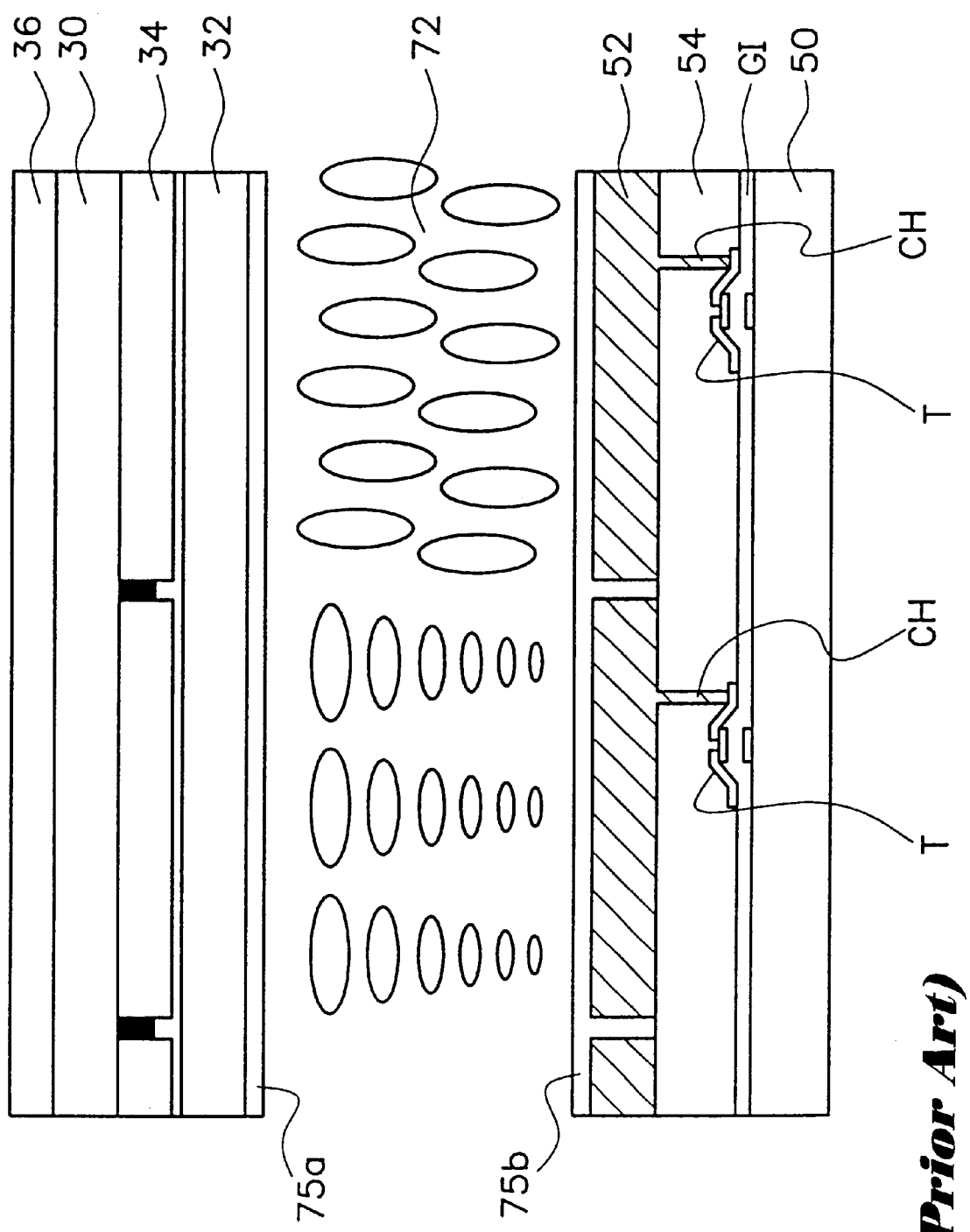
FIG. 4 is a view showing a multi-layer stacked structure of a conventional thin film transistor liquid crystal display device.
Figure 5:
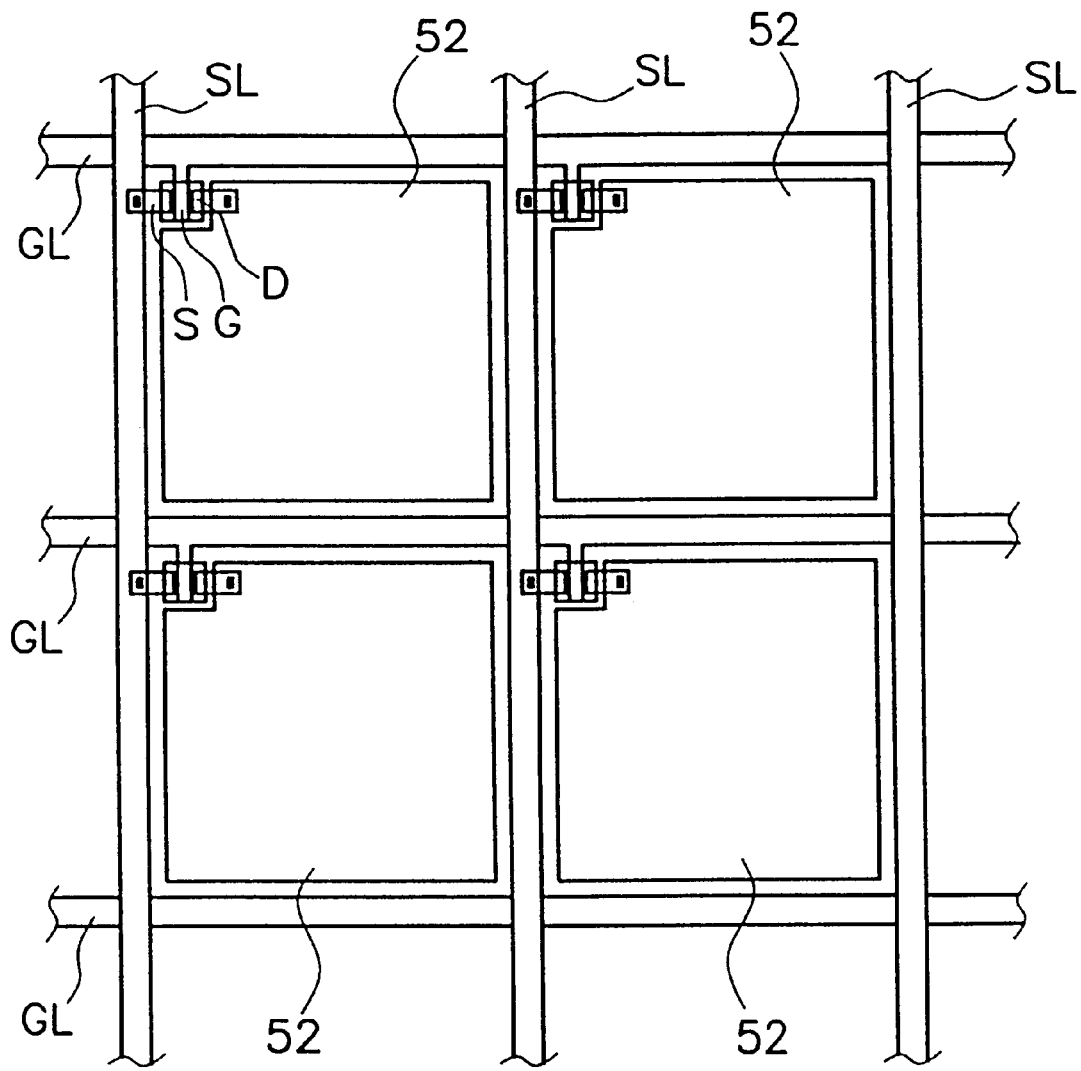
FIG. 5 is a view showing a layout of a conventional line pattern.

FIG. 3 shows a multi-layer stacked structure of the reflection type LCD device embodying the present invention. Referring to the drawing, the structure wherein a plurality of thin film transistors T1 and T2 are connected between the lines GL and SL and the unit pixel electrode 52 is different from the conventional LCD device shown in FIG. 4.

According to the present invention, even if any one of four sides GL1 to GL4 of the lattice pattern defined by the gate line GL and the source line SL is unexpectedly cut, the signal current can flow into the remaing sides.

For example, if the vertical side GL1 of the left line pattern is cut, the signal current can flow through the upper horizontal side GL2, the vertical side GL3 and the lower horizontal side GL4, thus providing signals to the transistors T2–T4.

Also, in the layout of LCD device according to the present invention, if any one of the thin film transistors T1 to T4 is deteriorated in function, the signal current can flow to the pixel electrode via the rest of normally functioning thin film transistors providing electric field needed for driving the liquid crystal.

In other words, according to the layout structure of the present invention, although any of the line patterns GL and SL is cut, or any one of the transistors connected to the lines GL and SL is deteriorated in function during the formation of the LCD device, the pixel still can be turned on and off. On a rare occasion when all four signal lines GL1–GL4 or all four transistors T1–T4 malfunction, the pixel will be defective.

When the several thin film transistors T1 to T4 are connected to the lines GL and SL, an 'ON'-current property of the transistors T1 to T4 can be improved remarkably and, therefore, a signal rising time can be also reduced to thereby reduce a switching time of the thin film transistors.

Furthermore, because the lines GL and SL are arranged in a trapezoid, resistance of the lines can be effectively reduced so that voltage potential difference between the pattern base portion PS connected to the drive IC and the end of the pattern is reduced. Thus, when the present invention is applied to the LCD device having a large-sized image screen with the high definition, which has long signal lines and increased scaning signal lines, the uniform and superior display quality of the device can be assured.

As mentioned above, since the present invention provides the line layout having two or more line patterns for the unit pixel, the pixel can be turned on and off effectively even when one of the thin film transistors connected to the lines malfunctions. Thus, yield of manufacturing the LCD device can be improved and, simultaneously, a lifetime of the device can be enhanced.

Further, according to the present invention, since several thin film transistors serving as the switching elements are easily connected to the pixel electrode in parallel, the ON-current characteristic of the switching elements can be improved and the switching time of the switching elements can be also reduced.

In addition, according to the layout of the present invention, because resistance of the lines is reduced as compared with that of the conventional LCD layout, the uniform and superior display quality in the case of the large-sized image screen with the high definition can be assured.

Meanwhile, the present invention is not limited to the aforementioned embodiment but is susceptible of numerous changes and modifications as known to those skilled in the art. For example, the present invention can be employed to a liquid crystal display device in which a pixel is formed by several pixel electrodes separated.

What is claimed is:

1. A thin film transistor liquid crystal display having a plurality of unit pixels, comprising:

primary lines and secondary lines to supply scanning signals and data signals respectively wherein each of said primary and secondary lines are branched to form primary branch lines and secondary branch lines, wherein the primary and secondary branch lines are each patterned in a lattice having two vertical sides and two horizontal sides for a unit pixel; and at least three thin film transistors associated with a unit pixel, each associated transistor being electrically coupled to at least one of the primary branch lines and at least one of the secondary branch lines, wherein the unit pixel is drivable by each of the associated transistors between on and off, wherein no two associated film transistors are directly coupled to a same side of the lattice of the primary branch line, and wherein no two associated film transistors are directly coupled to a same side of the lattice of the secondary branch line.

2. A thin film transistor liquid crystal display according to claim 1 wherein one of the thin film transistors is connected between one of the primary branch lines and one of the secondary branch lines so that if any one of the branch lines is cut, signal current still can flow to each of the plurality of pixels.

3. A thin film transistor liquid crystal display according to claim 2 wherein, the thin film transistors are a bottom gate type, and the primary line forms a gate line while the secondary line forms a source line, and a part of the gate line is utilized to form a gate electrode of the thin film transistors.

4. A thin film transistor liquid crystal display according to claim 3 wherein the gate line in at least one of the unit pixels is disposed inside of the source line.

5. A thin film transistor liquid crystal display according to claim 3 wherein the gate line lattice is smaller than the source line lattice.

6. A thin film transistor liquid crystal display according to claim 2 wherein the thin film transistors are of a same type.

7. A thin film transistor liquid crystal display according to claim 1 wherein the liquid crystal display is a reflection type liquid crystal display device.

8. A thin film transistor liquid crystal display according to claim 1 wherein the primary and secondary lines are composed of a thin film formed by using at least one element selected from Al, Cu, Mo, Ta, Cr, Ti W or Nd, or an alloy of the elements.

9. A thin film transistor liquid crystal display according to claim 1 wherein the primary and secondary branch lines are patterned in a trapezoid shape to define a lattice having two vertical sides and two horizontal sides for a unit pixel.

10. A thin film transistor liquid crystal display having a plurality of unit pixels, comprising:
   primary lines and secondary lines to supply scanning signals and data signals respectively wherein each of said primary and secondary lines are branched to form primary branch lines and secondary branch lines, wherein the primary and secondary branch lines are each patterned in a lattice having two vertical sides and two horizontal sides for a unit pixel;
   wherein each of the plurality of unit pixels communicates with at least three thin film transistors, each transistor being electrically coupled to at least one of the primary branch lines and at least one of the secondary branch lines, and each of the unit pixels is drivable between an on state and an off state by its associated plurality of transistors,
   wherein no two of the at least three thin film transistors are directly coupled to a same side of the lattice of the primary branch line, and wherein no two of the at least three thin film transistors are directly coupled to a same side of the lattice of the secondary branch line.

11. A thin film transistor liquid crystal display, comprising:
   a plurality of unit pixels;
   primary lines and secondary lines to supply scanning signals and data signals respectively to the plurality of unit pixels, each of said primary and secondary lines branched to form at least a pair of primary branch lines and a pair of secondary branch lines electrically coupled to each unit pixel wherein the primary and secondary branch lines are each patterned in a lattice having two vertical sides and two horizontal sides for a unit pixel; and
   at least three thin film transistors operating in parallel to switch each unit pixel, each thin film transistor being electrically coupled to at least one of the primary branch lines and at least one of the secondary branch lines,
   wherein no two of the at least three thin film transistors are directly coupled to a same side of the lattice of the primary branch line, and wherein no two of the at least three thin film transistors are directly coupled to a same side of the lattice of the secondary branch line.

12. A thin film transistor liquid crystal display having a plurality of unit pixels, comprising:
   primary lines and secondary lines to supply scanning signals and data signals respectively wherein each of said primary and secondary lines are branched to form primary branch lines and secondary branch lines respectively, wherein both a primary branch line and a secondary branch line are positioned adjacent each edge of each unit pixel, wherein the primary and secondary branch lines are each patterned in a lattice having two vertical sides and two horizontal sides for a unit pixel; and
   a plurality of thin film transistors associated with a unit pixel, each associated transistor being electrically coupled to at least one of the primary branch lines and at least one of the secondary branch lines, wherein the unit pixel is drivable by each of the associated transistors between on and off, wherein no two associated film transistors are directly coupled to a same side of the lattice of the primary branch line, and wherein no two associated film transistors are directly coupled to a same side of the lattice of the secondary branch line.

* * * * *